United States Patent
Keränen et al.

(10) Patent No.: US 12,156,109 B2
(45) Date of Patent: Nov. 26, 2024

(54) LWM2M CLIENT STATE SYNCHRONIZATION

(71) Applicant: Telefonaktiebolaget LM Ericsson (publ), Stockholm (SE)

(72) Inventors: Ari Keränen, Helsiki (FI); Jari Arkko, Kauniainen (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 245 days.

(21) Appl. No.: 17/291,643

(22) PCT Filed: Nov. 7, 2018

(86) PCT No.: PCT/EP2018/080450
§ 371 (c)(1),
(2) Date: May 6, 2021

(87) PCT Pub. No.: WO2020/094223
PCT Pub. Date: May 14, 2020

(65) Prior Publication Data
US 2021/0409922 A1 Dec. 30, 2021

(51) Int. Cl.
*H04W 4/70* (2018.01)
*H04W 60/04* (2009.01)
*H04W 60/06* (2009.01)
*H04W 76/19* (2018.01)

(52) U.S. Cl.
CPC ............ *H04W 4/70* (2018.02); *H04W 60/04* (2013.01); *H04W 60/06* (2013.01); *H04W 76/19* (2018.02)

(58) Field of Classification Search
CPC ....... H04W 4/70; H04W 76/19; H04W 60/04; H04W 60/06

USPC .......................................................... 370/329
See application file for complete search history.

(56) References Cited

U.S. PATENT DOCUMENTS

| | | | |
|---|---|---|---|
| 2015/0052610 A1* | 2/2015 | Thom | G06F 21/577 726/24 |
| 2015/0127831 A1* | 5/2015 | Kim | H04W 4/80 709/225 |
| 2019/0238536 A1* | 8/2019 | Chilla | H04L 63/0823 |

(Continued)

FOREIGN PATENT DOCUMENTS

CN 108293062 A 7/2018

OTHER PUBLICATIONS

International Search Report and Written Opinion of the International Searching Authority, PCT/EP2018/080450, mailed Jul. 17, 2019, 11 pages.

(Continued)

*Primary Examiner* — Mark G. Pannell
(74) *Attorney, Agent, or Firm* — Sage Patent Group

(57) ABSTRACT

A method of re-establishing a connection between a LWM2M client and an LWM2M server following a reconnection of the LWM2M client to the LWM2M server includes determining, at the LWM2M client, a state of the LWM2M client device prior to reconnection of the LWM2M client, transmitting, to the LWM2M server, an indication of the state of the LWM2M client prior to reconnection of the LWM2M client, and receiving a response from the LWM2M server indicating whether the indicated state of the LWM2M client is an expected state or an unexpected state of the LWM2M client.

21 Claims, 12 Drawing Sheets

(56) References Cited

U.S. PATENT DOCUMENTS

2020/0100319 A1* 3/2020 Talebi Fard ............ H04W 4/02

OTHER PUBLICATIONS

Open Mobile Alliance (OMA), "Lightweight Machine to Machine Technical Specification," OMA-TS-LightweightM2M-V1_0_2-20171116-D, Nov. 16, 2017, 141 pages.

Open Mobile Alliance (OMA SpecWorks), "Lightweight Machine to Machine Technical Specification: Core," OMA-TS-LightweightM2M-Core-V1_1-20180710-A, Jul. 10, 2018, 142 pages.

Open Mobile Alliance (OMA), "Lightweight Machine to Machine Technical Specification," OMA-TS-LightweightM2M-V1_0-20170208-A, Feb. 8, 2017, 138 pages.

* cited by examiner

| Object Version | Object ID |
|---|---|
| LWM2M Security v1.1 | 0 |
| LWM2M Server v1.1 | 1 |
| LWM2M Access Control v1.0 | 2 |
| LWM2M Device v1.0 | 3 |
| LWM2M Connectivity Monitoring v1.0 | 4 |
| LWM2M Firmware Update v1.0 | 5 |
| LWM2M Location v1.0 | 6 |
| LWM2M Connectivity Statistics v1.0 | 7 |
| LWM2M OSCORE v1.0 | 21 |

FIGURE 3A

| Object | Object ID | Object Instance ID |
|---|---|---|
| LWM2M Security Object (0) | 0 | 0 |
| LWM2M Security Object (1) | 0 | 1 |
| LWM2M Security Object (2) | 0 | 2 |
| LWM2M Server Object (1) | 1 | 0 |
| LWM2M Server Object (1) | 1 | 1 |
| Access Control Object (0) | 2 | 0 |
| Access Control Object (1) | 2 | 1 |
| Access Control Object (2) | 2 | 2 |
| Access Control Object (3) | 2 | 3 |
| Access Control Object (4) | 2 | 4 |
| Device Object | 3 | 0 |
| Connectivity Monitoring Object | 4 | 0 |
| Firmware Update Object | 5 | -- |

FIGURE 3B

LWM2M CLIENT STATE SYNCHRONIZATION

CROSS REFERENCE TO RELATED APPLICATIONS

This application is a 35 U.S.C. § 371 national stage application of PCT International Application No. PCT/EP2018/080450 filed on Nov. 7, 2018, the disclosure and content of which is incorporated by reference herein in its entirety.

TECHNICAL FIELD

The technology disclosed herein relates generally to the field of data communication, and in particular to methods and devices for synchronizing a state of a Lightweight Machine-to-Machine (LWM2M) client device with an LWM2M server, to an LWM2M client device, and an LWM2M server.

BACKGROUND

Machine to machine (M2M) is a concept encompassing devices, such as sensors and so-called smart devices, using a network for communicating with remote applications of e.g. a server of Internet. Such communication may, for example, be for the purpose of monitoring and control. Internet of Things (IoT) refers to a network of objects ("things") with network connectivity, and M2M may be considered an integral part of IoT. Together M2M/IoT covers a huge set of devices that communicate with each other directly and across networks based on various communication or access media, using short range wireless technologies (e.g. Bluetooth or WiFi) as well as long range technologies (e.g. radio access technologies, such as 3G, 4G, New Radio, etc.).

Lightweight M2M (LWM2M) is a standard promulgated by OMA SpecWorks that is focused on constrained cellular devices and other M2M devices. The standard defines an efficient device-server interface based on open Internet Engineering Task Force (IETF) standards, such as Constrained Application Protocol (CoAP) and Datagram Transport Layer Security (DTLS). The LWM2M enabler includes device management and service enablement for LWM2M devices, and uses a light and compact protocol as well as an efficient resource data model to fit on constrained LWM2M devices.

LWM2M client devices, or LWM2M clients, typically have limited processing and storage capabilities as well as limited power sources. The power consumption of the LWM2M client is hence an issue and needs to be considered to keep the device functional as long as possible without maintenance. In view of this, there is a need to make overhead operations, such as the LWM2M client registration process, as efficient as possible.

SUMMARY

A lightweight machine-to-machine, LWM2M, client device includes a processor circuit, a transceiver coupled to the processor circuit, and a memory coupled to the processor circuit, wherein the memory includes machine readable program instructions that, when executed by the processor circuit, cause the LWM2M client device to perform the operations including determining, at the LWM2M client, a state of the LWM2M client device prior to reconnection of the LWM2M client to an LWM2M server, transmitting, to the LWM2M server, an indication of the state of the LWM2M client prior to reconnection of the LWM2M client, and receiving a response from the LWM2M server indicating whether the indicated state of the LWM2M client is the expected state of the LWM2M client or an unexpected state.

A method of re-establishing a connection between a LWM2M client and an LWM2M server following a reconnection of the LWM2M client includes determining, at the LWM2M client, a state of the LWM2M client device prior to reconnection of the LWM2M client, transmitting, to the LWM2M server, an indication of the state of the LWM2M client prior to reconnection of the LWM2M client, and receiving a response from the LWM2M indicating whether the indicated state of the LWM2M client is the expected state of the LWM2M client or an unexpected state.

If the response from the LWM2M server indicates that the indicated state of the LWM2M client is out of date, the method may further include synchronizing the state of the LWM2M client with the LWM2M server.

The state of the LWM2M client prior to reconnection of the LWM2M client may be determined by obtaining the indication of the state of the LWM2M client prior to reconnection of the LWM2M client.

In some embodiments, the method may further include, prior to the reconnection of the LWM2M client, determining a state of the LWM2M client, generating the indication of the state of the LWM2M client based on the determined state of the LWM2M client, and storing the indication of the state of the LWM2M client.

In some embodiments, the indication of the state of the LWM2M client may include a state counter or generation counter.

In some embodiments, the indication of the state of the LWM2M client may include a digest value that is generated as a function of a state modifying message that was transmitted or received by the LWM2M client. The state modifying message may include, for example, a registration message, an observe subscription message and/or an observe data transmission.

The digest value may include a hash value generated using a hashing function that is applied to the state modifying message. In some embodiments, the digest value may include a checksum value generated using a checksum function that is applied to the state modifying message.

The indication of the state of the LWM2M client may include a digest value that is generated as a function of a state modifying message that was transmitted or received by the LWM2M client and a nonce value that was exchanged between the LWM2M client and the LWM2M server at registration of the LWM2M client to the LWM2M server.

The indication of the state of the LWM2M client may include a digest value that is generated as a function of a plurality of state modifying messages that were transmitted or received by the LWM2M client.

Reconnection of the LWM2M client may occur following a reboot of the LWM2M client after a shutdown and/or waking the LWM2M client up from a sleep mode.

If the response from the LWM2M server indicates that the indicated state of the LWM2M client is unexpected, the LWM2M client may re-register with the LWM2M server and/or update existing observe subscriptions.

In some embodiments, if the response from the LWM2M server indicates that the indicated state of the LWM2M client is unexpected, the method may further include re-registering the LWM2M client to the LWM2M server.

A LWM2M server according to some embodiments includes a processor circuit, a network interface coupled to the processor circuit, and a memory coupled to the processor circuit, wherein the memory includes machine readable program instructions that, when executed by the processor circuit, cause the LWM2M server to perform the operations comprising receiving, from the LWM2M client, an indication of a state of the LWM2M client, obtaining an expected state of the LWM2M client, comparing the indication of the state of the LWM2M client with an expected state of the LWM2M client, and in response to the comparison of the indicated state of the LWM2M client with the expected state of the LWM2M client, determining that the indicated state of the LWM2M client is out of date, and synchronizing the state of the LWM2M client with the LWM2M server.

A method of re-establishing a connection between a LWM2M client and an LWM2M server includes receiving, from the LWM2M client, an indication of a state of the LWM2M client, obtaining an expected state of the LWM2M client, comparing the indication of the state of the LWM2M client with an expected state of the LWM2M client, and in response to the comparison of the indicated state of the LWM2M client with the expected state of the LWM2M client, determining that the indicated state of the LWM2M client is out of date, and synchronizing the state of the LWM2M client with the LWM2M server.

BRIEF DESCRIPTION OF THE DRAWINGS

FIG. 3A is a table illustrating an example of objects that may be supported by an LWM2M client.

FIG. 3B is a table illustrating an example of objects that may be instantiated an LWM2M client.

DESCRIPTION OF EMBODIMENTS

Figure 1:
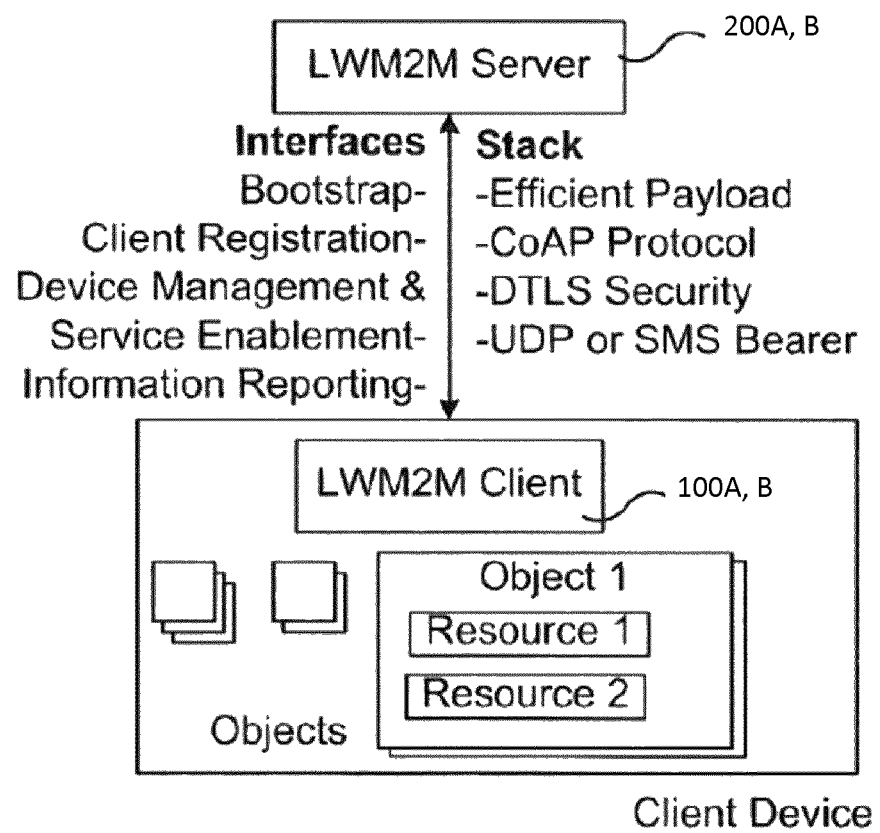
FIG. 1 illustrates an LWM2M architecture.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Some embodiments described herein may provide systems/methods that are capable of more efficiently registering LWM2M client devices to LWM2M servers in terms of power consumption and/or bandwidth requirements In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Constrained Application Protocol (CoAP) is an example of a protocol designed for Internet of Things (IoT) applications in constrained nodes and constrained networks. CoAP provides a request-response based RESTful communication architecture between constrained devices or between constrained devices and nodes in the Internet. CoAP can easily be integrated to World Wide Web (WWW) ("the web") and web services by translating CoAP messages to Hypertext Transfer Protocol (HTTP) messages.

The OMA SpecWorks Device Management (OMA DM) LWM2M protocol is a light and compact device management protocol that is used for managing IoT devices and their resources. LWM2M runs on top of CoAP, which either uses User Datagram Protocol (UDP), Transmission Control Protocol (TCP) or Systems Management Server (SMS) bindings. Hence, LWM2M is compatible with any constrained device which supports CoAP. LWM2M defines three components: the LWM2M Client, the LWM2M Server and the LWM2M Bootstrap Server. To maintain communication between these components, various LWM2M interfaces are defined, as discussed herein.

The LWM2M client contains several LWM2M objects with several resources. The LWM2M server can execute commands on these resources to manage the client, including, for example, commands to read, delete or update the resources. LWM2M clients are generally constrained devices in terms of processing capacity, power source, memory etc.

The LWM2M server manages LWM2M clients by sending management commands to them.

FIG. 1 illustrates an LWM2M architecture including an LWM2M server 200 and an LWM2M client application 110 (sometimes also denoted simply LWM2M client 110 or client 110) running on an LWM2M client device 100, e.g. a M2M device such as a sensor. Although only a single LWM2M client 110 is shown in FIG. 1, multiple LWM2M clients 110 may operate on a single LWM2M client device 100. To maintain the communication between the LWM2M client 100, LWM2M server 200 and an LWM2M bootstrap server (not shown in FIG. 1), the following LWM2M interfaces are defined:

Bootstrapping: The LWM2M bootstrap server sets the initial configuration on the LWM2M client 110 when it boots.

Client Registration: The LWM2M client 110 registers to one or more LWM2M servers 200 when the bootstrapping is completed. The client registration interface is described in more detail below.

Device Management and Service Enablement: The LWM2M server 200 can send management commands to LWM2M clients 110 to perform management actions on LWM2M resources of the client 110. Access control object of the client 110 determines the set of actions the server 200 can perform.

Information Reporting: As a feature of CoAP Observe-Notify mechanism, LWM2M clients 110 can initiate the communication to LWM2M server 200 and report information in the form of notifications.

Interfaces between the LWM2M server 200 and the LWM2M client 110 thus include: bootstrapping, which may be pre-provisioned or client/server initiated; client registration, wherein the client and its objects are registered; device management and service enablement, providing server access to objects or resources; and information reporting, enabling notifications with new resource values.

The LWM2M client 110 includes a number of object instances. An object is a collection of resources; a resource is a piece of information that can be read, written or executed. Each resource may have multiple instances (e.g. height H, weight W, length L). Objects and resources are identified by a 16-bit integer, while instances are identified by an 8-bit integer. Objects and resources may be accessed with simple Uniform Resource Identifiers (URIs).

Client Registration Interface

The Client Registration Interface is used by an LWM2M client 110 to register with one or more LWM2M servers 200, to maintain each registration, and to de-register from an LWM2M server 200. When registering, the LWM2M client 110 performs the "Register" operation and provides the properties required by the LWM2M server 200 (e.g. the supported Objects and existing Object Instances) as well as optional parameters (e.g. Endpoint Client Name). The LWM2M client 110 maintains the registration and communications session(s) with each LWM2M server 200 based on the configured parameters (e.g. Lifetime, Queue Mode). The LWM2M client periodically performs an update of its registration information to the registered LWM2M server(s) 200 by performing the "Update" operation.

Registration is performed when an LWM2M client 110 sends a "Register" operation to the LWM2M Server. After the LWM2M client device 100 is turned on and the bootstrap procedure has been completed, the LWM2M client 110 performs a "Register" operation to each LWM2M server 200 for which the LWM2M client 110 has a Server Object Instance. The registration process is illustrated in FIG. 2.

Figure 2:
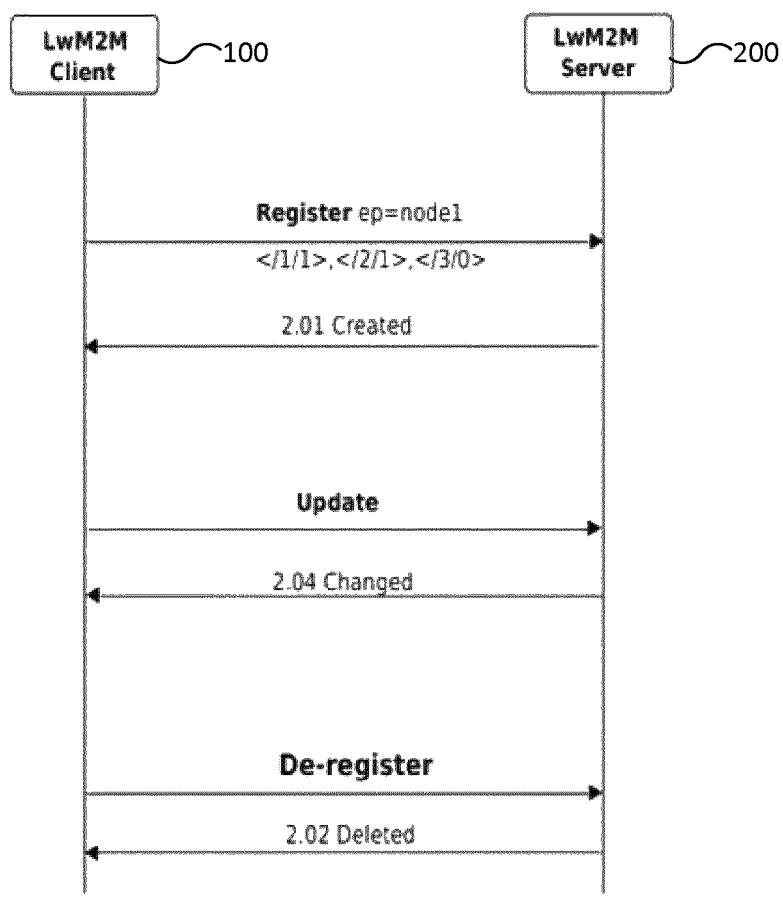
FIG. 2 is a flow diagram illustrating various conventional operations of an LWM2M client and an LWM2M server.

As shown in FIG. 2, The "Register" operation may include the Endpoint Client Name parameter ("ep=") along with other parameters. Upon receiving a "Register" operation from the LWM2M client 110, the LWM2M server 200 records the connection information of the Registration message (e.g. source IP address and port or MSISDN) and uses this information for all future interactions with that LWM2M client 110.

Brief reference is made to FIG. 3A, which is a table showing an example of object versions, or object types, that may be supported by an LWM2M client 110. Each object version has an associated Object ID. The payload of the "Register" operation identifies the object types supported by the LWM2M client 100. Thus, for example, for an LWM2M client 110 supporting LWM2M Server, Access Control, Device, Connectivity Monitoring and Firmware Update objects shown in FIG. 3A, the payload of the "Register" operation would simply be:

</1>, </2>, </3>, </4>, </5>

Brief reference is now made to FIG. 3B, which is a table showing an example of an LWM2M client 110 that supports LWM2M Server, Access Control, Device, Connectivity Monitoring and Firmware Update objects, some of which are already instantiated. Each instantiated object is identified by an Object ID and an Object Instance ID. If object instances are already available on the LWM2M client 110 at the time of registration, then the payload of the "Register" operation identifies the objects by Object ID and Object Instance ID. For example, using the example of FIG. 3B, the format of the "Register" operation payload would be:

</1/0>,</1/1>,</2/0>,</2/1>,</2/2>,</2/3>,</2/4>,</3/0>,</4/0>,</5>

If the LWM2M client 110 supports the JSON data format for all the objects, it may inform the LWM2M server 200 by including the content type in the root path link using the ct= link attribute. An example is as follows (note that the content type value 110 is the value assigned in the CoAP Content-Format Registry for the SenML JSON format used by LWM2M).

</>;ct=110, </1/0>,</1/1>,</2/0>,</2/1>,</2/2>,</2/3>, </2/4>,</3/0>,</4/0>,</5>

The "Register" operation may take the form of an HTTP POST command transmitted to the LWM2M server 200. For example, a POST command transmitted to the URI "/rd" (where "rd" stands for resource directory) of an LWM2M server 200 that implements the "Register" operation for an LWM2M client 110 having an endpoint name of "epname" may be the following:

POST /rd?ep=epname&b=SQ </>; ct=11543, </1/0>,</1/1>, </2/0>,</2/1>, </2/2>,</2/3>, </2/4>,</3/0>, </4/0>,</5>

Upon successful registration, the LWM2M server 200 responds with an acknowledgment message ("ACK") indicating a URI assigned to the device, e.g.:

ACK 2.01 /rd/ls45

At the LWM2M server 200, registration information for registered devices is maintained in the resource directory. The resource directory mechanism consists of a resource representing a "thing" (such as a temperature sensor) that is registered to a common directory of resources. Once such a registration is made, both the directory server and others using it will know about the existence of the resource. They can then, for instance, use the resource and the client to query the device for information, such as a current temperature.

The CoAP "observe" mechanism consists of a subscription to information. In the LWM2M model this subscription is a request sent by the LWM2M server 200 to the LWM2M client 110 that hosts a resource. Upon specified time intervals or changes in a sensor value, the LWM2M client 110 will then subsequently send updates to the LWM2M server 200, containing the most recent measured sensor value. Subscriptions and associated subsequent notifications of sensor values carry a token value that helps match the two to each other. The benefit of the observe mechanism is that the LWM2M server 200 does not have to continuously poll for information.

Together, these mechanisms allow services in the network to collect a database of things in the network and to obtain their most recent sensor readings.

However, the CoAP resource directory and observe models assume a shared state between a client and a server. That is, both the LWM2M client 110 and the LWM2M server 200 are aware of the state of the LWM2M client 110. Upon a reboot or other failure of the LWM2M client 110, either the LWM2M client 110 or the LWM2M server 200 may lose track of the state. If that happens, the server may need to update the state of the LWM2M client 110. For the observe functionality, the reboot of an LWM2M server 200 can be detected when it returns an error for not recognizing a token carried in a notification. The reboot of an LWM2M client 110 can be detected, for example, if the LWM2M server 200 does not receive any updates from a client within designated time frame.

For the resource directory functionality, clients are expected to periodically refresh registrations.

However, these methods may be slow and/or inefficient. In particular, an LWM2M client 110 knows when it is booting up or powering up from a sleep state, and can perform necessary operations to refresh its state at the server. The LWM2M client 110 may also have partial knowledge of its past state stored in non-volatile memory. The LWM2M client 110 may remember, for example, a registration and its lifetime, tokens and servers associated with observe requests, or most recent sensor values sent to interested parties. However, the LWM2M client 110 may have missed changes between last stored state and whatever led to a crash, power off, power down, sleep mode, etc.

While crashes and accidental power-offs may be exceptional cases, low-power IoT devices are preferably able to shut down partially or completely (e.g., enter sleep mode) for a large part of their time to conserve power. Thus, it may be important for an LWM2M client device 100 to be able to power-off, and not be responsive to requests while it is powered off.

During and after registration, an LWM2M client 110 may send and/or receive a number of messages that affect the state of the LWM2M client device 110. For example, an LWM2M client may send/receive a registration message, an observe subscription message, an observe data transmission, or other message that causes the state of the LWM2M client to be modified. Such message is referred to herein as a "state-modifying message." Some embodiments may maintain an indication of the state of the LWM2M client 110 at both the LWM2M client 110 and the LWM2M server 200 that is updated whenever the LWM2M client 110 sends or receives a state-modifying message. If the LWM2M client 110 regains connectivity with the LWM2M server 200, initializes, restarts, reboots or awakens from sleep mode (such events referred to herein as a "reconnection"), the LWM2M client 110 and the LWM2M server 200 may use the indication of the state of the LWM2M client 110 to determine whether any state-modifying messages need to be re-transmitted.

Accordingly, systems and/or methods are provided according to some embodiments are provided that may enable an LWM2M client 100 and an LWM2M server 200 to synchronize state such that a full rerun of all operations (e.g., re-sending all state-modifying messages) after a reconnection may be unnecessary.

For example, an LWM2M client 110 may quickly determine, based on stored information about its state, whether it needs to restore full state everywhere, or whether re-running only a smaller set of operations may suffice to ensure that its state is up to date after a reconnection.

Mechanisms for synchronizing data bases or file system directories across machines are known. These mechanisms may synchronize based on reviewing a list of most recent changes (e.g., "git pull"), explicitly asking if a particular item is remembered by the other party, and/or by using individual checksum values, such as individual file checksums, to determine whether individual files are up to date. Such an approach may be referred to as "hard synchronization."

That is, previous approaches to synchronization are focused on making sure that explicit transactions at either end of a connection are reflected on both sides. In contrast, some embodiments described herein may ensure that the current state of an IoT device, rather than the state of an individual file or value, are consistent across the client/server connection. Such state may include the state of dynamically changing values, such as sensor data. That is, the state may be updated/synchronized even if the sensor value is changed. This approach may be referred to as "soft synchronization."

Some soft state solutions, like NAT binding, may be based on explicitly testing whether the state item is still valid or attempting to use the facility that requires the item to be remembered. Upon failure, the state needs to be re-established. In contrast, some embodiments perform an initial check for a summary of the state following a reconnection rather than failing later when in the event of a conflict.

Figure 4A:
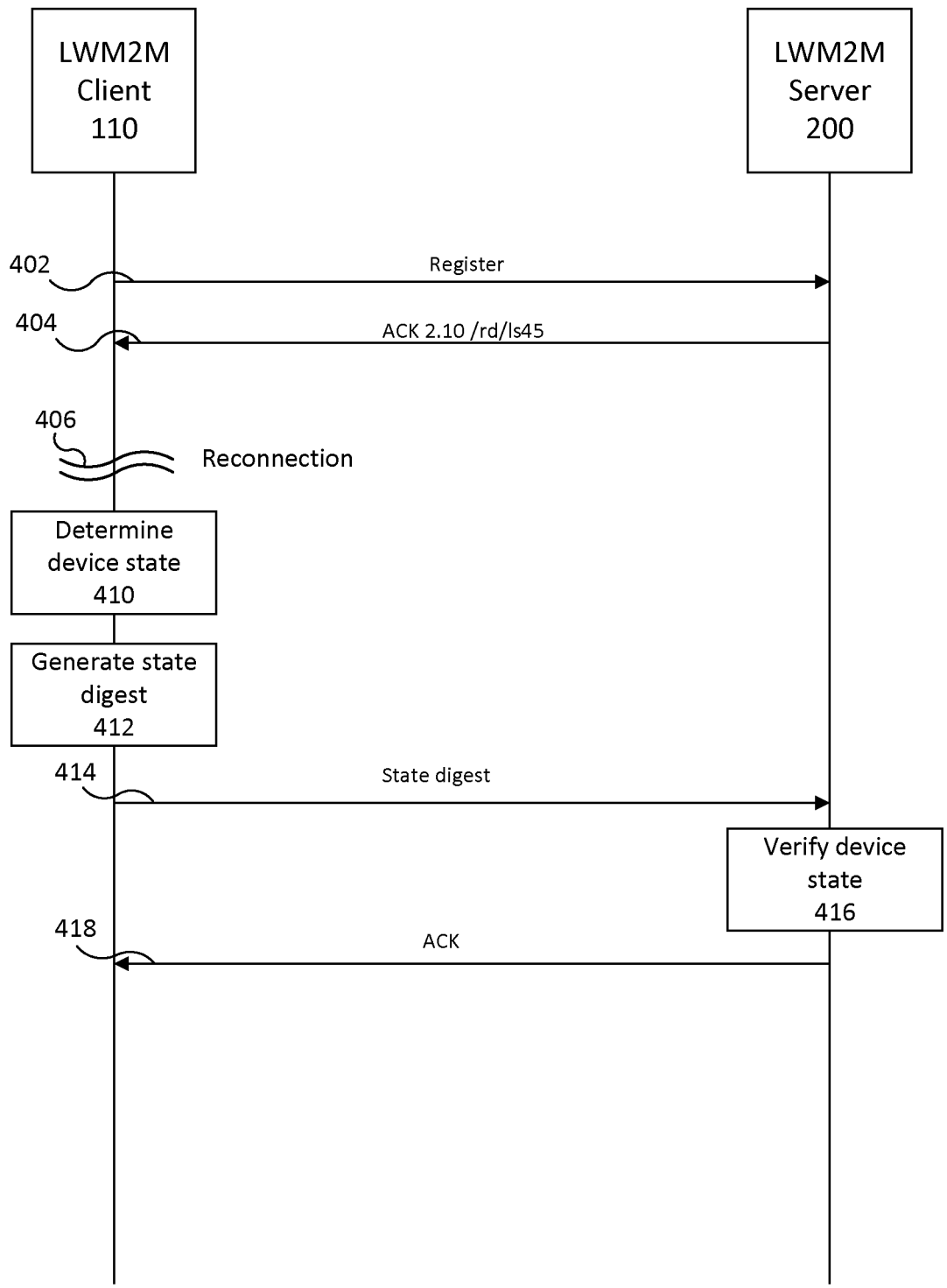
FIGS. 4A, 4B, 4C, 5, and 6, are flow diagrams illustrating various operations of an LWM2M client and an LWM2M server according to some embodiments of the inventive concepts.

Operations according to some embodiment are illustrated in the flow diagram of FIG. 4A. As shown therein, an LWM2M client 110 may register with an LWM2M server 200 by sending a registration message 402 as described above. The LWM2M server 200 responds with an acknowledgement 404. At that point, the state of the LWM2M client 110 is now "registered" based on the state-modifying ACK message 404.

Next, at some point following registration, the LWM2M client device 100 that hosts the LWM2M client 110 requires reconnection 406 to the LWM2M server 200, such as if the LWM2M client 110 loses connectivity to the LWM2M server 200, or undergoes a restart, due to the LWM2M client device 100 rebooting or waking up from sleep mode. The LWM2M client 110 may then determine its state (block 410) and generate a state digest indicative of its state. The state digest may include, for example, a state counter that is updated each time the LWM2M client 110 sends or receives a state-modifying message, such as the registration acknowledgement message 404. In some embodiments, the state digest may include a checksum calculated based on all state-modifying messages that are collectively define the current state of the LWM2M client 110. The generation of state digests is described more fully below.

Although the determination of state and the generation of the state digest are illustrated in FIG. 4A as occurring following the reconnection 406, in some embodiments these operations may be performed before reconnection. For example, in some embodiments, the LWM2M client 110 may generate a new state digest every time the LWM2M client 110 sends or receives a state-modifying message.

After the LWM2M client device 100 that hosts the LWM2M client 110 has reconnected, the LWM2M client 110 confirms that the LWM2M server 200 agrees as to the current state of the LWM2M client 110. In some embodiments, the LWM2M client 110 may do this by transmitting the state digest to the LWM2M server 200 in a message 414. The LWM2M server 200 examines the state digest (block 416), and if it corresponds to an expected state digest, transmits a positive response (e.g., an ACK) 418 to the LWM2M client 110. To verify the state of the LWM2M client 110, in some embodiments, the LWM2M server may calculate an expected state digest based on state-modifying messages that are known to have been sent/received by the LWM2M client 110 and compare it to the state digest provided by the LWM2M client 110 in the message 414.

In other embodiments, the LWM2M server 200 may generate and store a most recent state digest each time the LWM2M client 110 sends or receives a state-modifying message. In that case, to verify the state digest of the LWM2M client 110, the LWM2M server 200 simply retrieves the most recent state digest for the LWM2M client 110 from storage and compares it to the state digest provided by the LWM2M client 110 in the message 414.

Figure 4B:
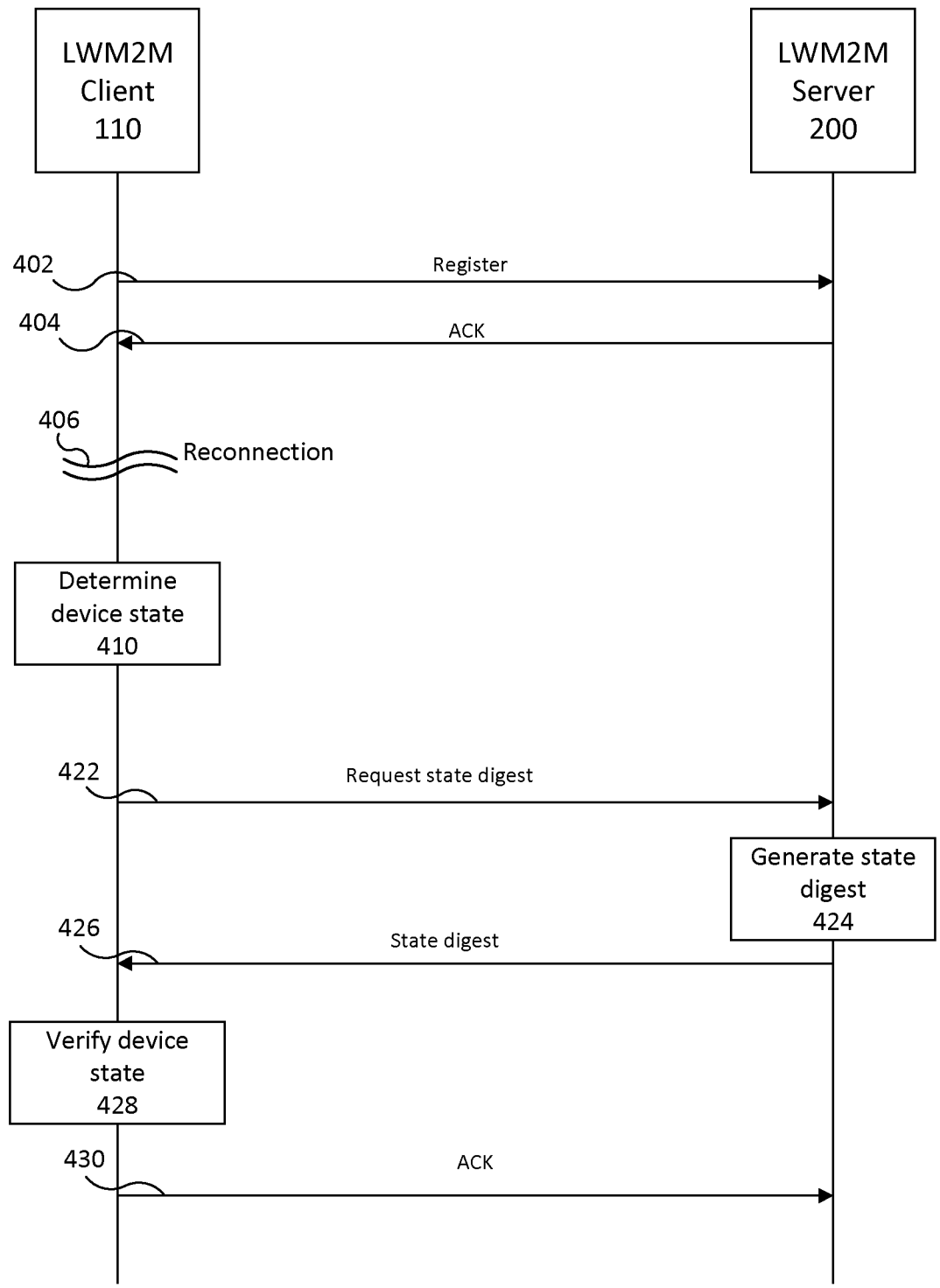

Further embodiments are illustrated in FIG. 4B. The operations of FIG. 4B are similar to those illustrated in FIG. 4A, except that following reconnection, the LWM2M client 110 synchronizes its state with the LWM2M server 200 by transmitting a message 422 to the LWM2M server 200 requesting the state digest. In response, the LWM2M server 200 generates or retrieves the state digest corresponding to the LWM2M client 110 (block 424) and transmits it to the LWM2M client 110 in a message 426. The LWM2M client 110 verifies the state digest (block 428) and, if the verification indicates that the state is synchronized, transmits an acknowledgement 430 to the LWM2M server 200.

Accordingly, in some embodiments, when an LWM2M client 110 reconnects, the LWM2M client 110 and the LWM2M server 200 may exchange an indication of the current state of the LWM2M client 110. If the state matches the expected state, no further action is needed. Further, in some embodiments, the LWM2M client 110 device can check for earlier digests and if one matches, the LWM2M client 110 and the LWM2M server 200 know which updates were missed and can perform only those updates.

That is, after a reconnection (such as due to a shutdown/crash/sleep mode/loss of connectivity), something may have happened that the LWM2M client 110 is not aware of. This can include, for example, new observe requests, cancellation of observe requests, data sent from the LWM2M client 110 to the LWM2M server 200 that the LWM2M client 110 itself no longer remembers sending, and so on. Information that should be synchronized may include, for example, registrations, observe subscriptions and transmissions of observe data to observer subscribers. Such messages may be state-modifying messages as described herein. In the event of a reconnection, if the state of the LWM2M client 110 is not the same as the state expected by the LWM2M server 110, it may be desirable to re-transmit such messages to synchronize the state of the client.

Figure 4C:
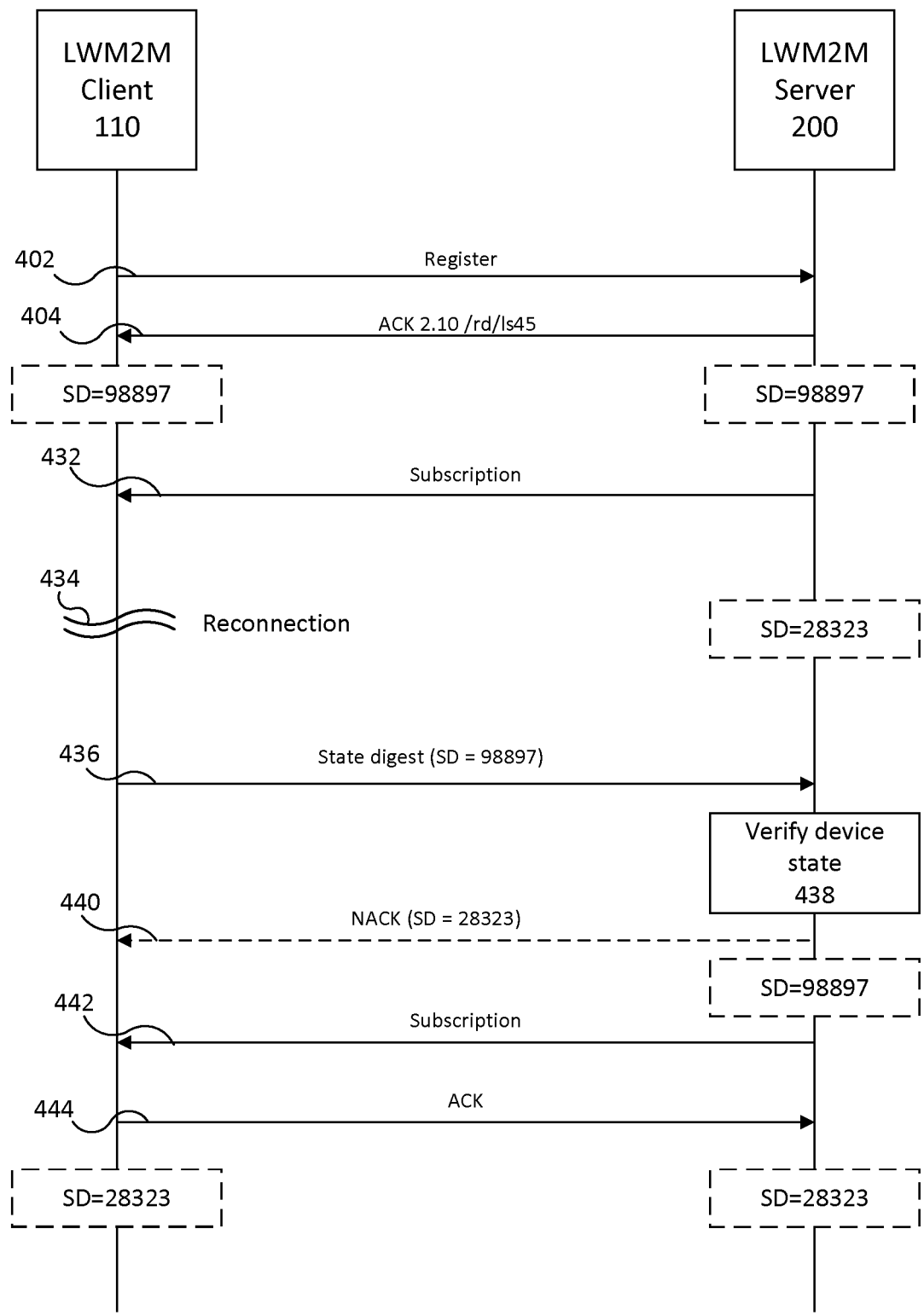

An example of such a procedure is illustrated in FIG. 4C. As shown therein, after receiving the registration acknowledgement message 404, the LWM2M client 110 may have an updated state represented by a state digest (SD) of 98897. This state is known to both the LWM2M client 110 and the LWM2M server 200.

The LWM2M server 200 then sends a state-modifying message 432 to the LWM2M client 110 in the form of a subscription message. At that point, the LWM2M server 200 believes that the LWM2M client 110 has an updated state represented by the state digest 28323. However, at some point near the time the message 432 was sent, the LWM2M client 110 undergoes a reconnection 434 and does not process the message 432. Thus, after the reconnection, the LWM2M client 110 believes its state to correspond to the earlier state digest (SD=98897).

After reconnection, to confirm synchronization, the LWM2M client 110 sends its state digest to the LWM2M server 200 in a message 436. The LWM2M server 200 examines the state digest provided by the LWM2M client 110 at block 438 and determines that the state digest provided by the LWM2M client 110 corresponds to an earlier state.

In some embodiments, the LWM2M server 200 may simply update its version of the state of the LWM2M client 110 and continue with normal operations.

In other embodiments, the LWM2M server may send an optional negative acknowledgement 440 back to the LWM2M client 110 indicating the expected state digest.

In some embodiments, the LWM2M server may re-transmit state-modifying messages that the LWM2M client 110 missed based on the state digest provided by the LWM2M client 110. For example, the LWM2M server 200 may re-transmit the subscription message to the LWM2M client 110 in a new message 442. The LWM2M client 110 may respond to the subscription message with an acknowledgement 444, at which point both the LWM2M client 110 and the LWM2M server 200 understand the state of the LWM2M client 110 to correspond to a state digest of 28323.

In some embodiments, the LWM2M server 200 may not update the state of the LWM2M client 110 based on a state-modifying message transmitted to the LWM2M client 110 until the LWM2M server has received an acknowledgement of the state-modifying message from the LWM2M client 110. In some embodiments, the LWM2M client 110 may send a new state digest value with every message it sends to the LWM2M server 200.

As is apparent from the message flow shown in FIG. 4C, an LWM2M client 110 may not need to redo a registration process (and potentially one or more subscription and sensor data update processes) following a reconnection. Rather, the LWM2M client 110 may only need to redo actions that occurred since a previous state of the LWM2M client 110.

In some embodiments, the indication of the state of the LWM2M client 110 may be a counter that is updated every time the LWM2M client 110 sends or receives a state-updating message. Both the LWM2M client 110 and the LWM2M server 200 may keep track of the counter for the LWM2M client 110. In other embodiments, the indication of the state of the LWM2M client 110 may be a digest value that is calculated according to a method that is known to both the LWM2M client 110 and the LWM2M server 200 so that either the LWM2M client 110 and the LWM2M server 200 can calculate the digest value based on previous activities of the LWM2M client 110, such as registration, subscriptions, observe messages, etc. For example, the digest value may be calculated by concatenating all previous state-modifying messages into a single string and calculating checksum or hash of the string as follows:

$$SD = f(S1 + S2 + \ldots + Sn) \qquad [1]$$

where SD is the state digest, f( ) is the checksum or hash function, and Sn is the state resulting from the nth state-modifying message sent/received by the LWM2M client 110. Since both the LWM2M client 110 and the LWM2M server 200 are aware of all of the state-modifying message sent/received by the LWM2M client 110, either entity can calculate the state of the LWM2M client 110. The function f( ) may include a checksum function, a cyclic redundancy code (CRC) function, a cryptographic hashing function, such as MD5, SHA1 or SHA256, or a non-cryptographic hashing function.

In other embodiments, the state of the LWM2M client 110 can be updated from the previous state by calculating a checksum or hash based on a concatenation of the previous state digest and the most recent state-modifying message as follows:

$$SD_{n+1} = f(SD_n + S_{n+1}) \qquad [2]$$

where $SD_{n+1}$ is the updated digest value, $SD_n$ is the previous digest value and $S_{n+1}$ is the state resulting from the state-modifying message. Again, since both the LWM2M client 110 and the LWM2M server 200 are aware of all of the state-modifying message sent/received by the LWM2M client 110, either entity can calculate the state of the LWM2M client 110.

In embodiments in which the state digest is maintained as a generation counter, the generation counter may include a random component so that different reboots can be distinguished from one another. That is, when the generation counter is reset, it will not always begin with the same number (e.g., 0 or 1) but may begin at a random value and increase upon every change (registration, subscription, notification of new data, etc.).

In embodiments in which a digest value is used to indicate the state of a client, the client and server must agree on a method of generating the digest value, namely both endpoints must agree on an algorithm to be used and what inputs shall be used to generate the digest value.

The indication of state can be sent either as a new exchange from the LWM2M client 110 to the LWM2M server 200, or it may be piggybacked in a registration request such that an LWM2M server 200 responding to the request can omit processing the registration request if the indication of state already matches the client state stored at the server.

In operation, an LWM2M client 110 needs to register itself to various servers, directories, and other interested parties, and to send updates to the network about its latest sensor values. These registrations and updates can take significant amount of resources from the client device, and it would be desirable to avoid performing unnecessary actions if possible. When the LWM2M client 110 reconnects, it may not know if the state stored in the network matches the state in the device. According to some embodiments, the device can provide an indication of its state to a n LWM2M server 200 and ask the server if its version of the client state matches the client's version. If the states match, the client 110 may resume normal operation. If the state indicated by the client corresponds to an earlier state known to the server 200, the server 200 may perform only those updates needed to bring the state of the client 110 current.

Figure 5:
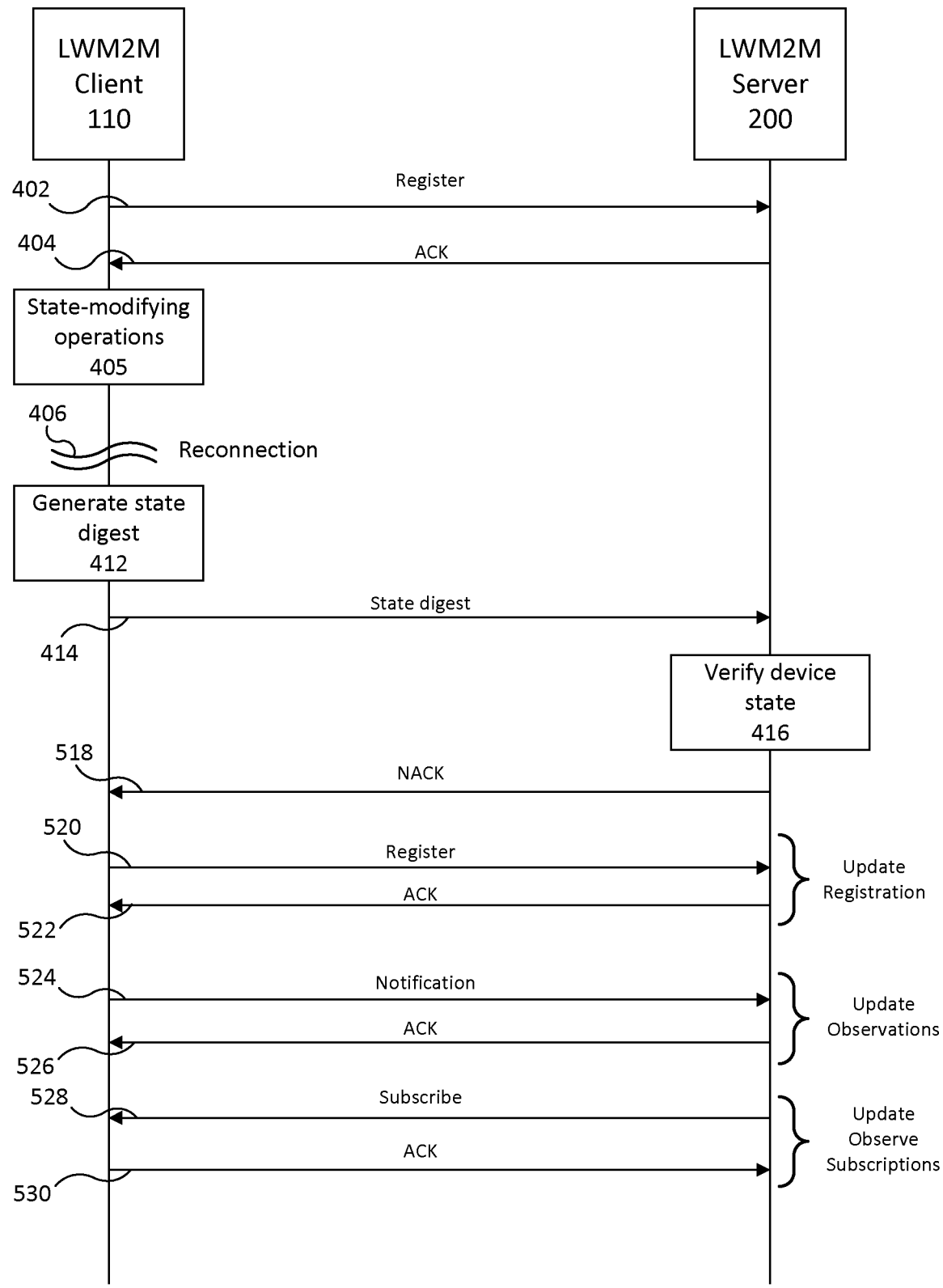

An example of such an operation is shown in FIG. 5. As shown therein, an LWM2M client 110 may register with an LWM2M server 200 via a registration message 402 and a response 404. The LWM2M client 110 may conduct one or more state-modifying operations 405 that change the state of the LWM2M client 110. After performing the state-modifying operations 405, the LWM2M client 110 may reconnect 406, for example, due to a loss of connectivity, or a reboot, power-off or sleep of the LWM2M client device 100 hosting the LWM2M client 110. When the LWM2M client 110 reconnects, it generates a state digest that corresponds to its understanding of its state at block 412. The LWM2M client 110 sends the state digest to the LWM2M server 200 in a message 414. The LWM2M server 200 verifies the state of the LWM2M client 110 at block 416. If the LWM2M server 200 determines that the digest value provided by the LWM2M client 110 corresponds to an earlier known state, the LWM2M server 200 may indicate this to the LWM2M client 110 via a negative acknowledgement (NACK) 518, and may cause one or more state-modifying operations to be re-run. For example, in response to the NACK, the LWM2M client 110 update its registration by transmitting a new registration message 520 to the LWM2M server 200. The LWM2M client 110 may update its observations by sending an observe notification message 524 to the LWM2M server 200. Additionally, the LWM2M server 200 may update the observe subscriptions at the LWM2M client 110 by transmitting one or more subscribe messages 528 to the LWM2M client 110. Once the state of the LWM2M client 110 has been updated to the current state, the LWM2M client 110 and LWM2M server 200 may exchange digest values to verify that the state of the LWM2M client 110 is synchronized at each end.

Figure 6:
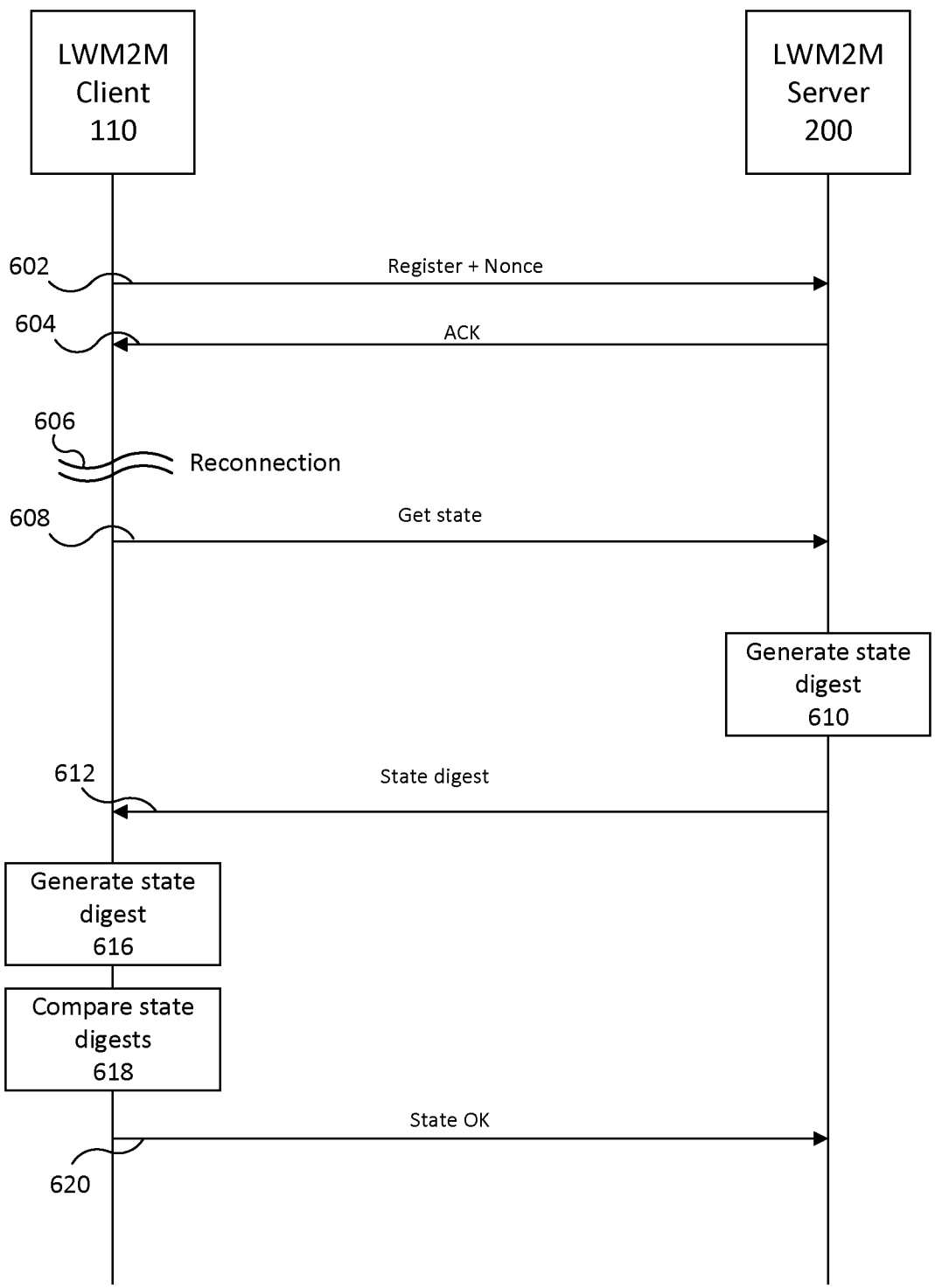

In the digest value approach it is useful to include an initial random nonce value so that outsiders cannot guess the contents of the state based on looking at the digest value. For example, as shown in FIG. 6, a registration message 602 from the LWM2M client 110 to the LWM2M server 200 may include a nonce value. The nonce value may be appended to one or more state modifying messages, so that the state digest generated by the LWM2M client 110 and the LWM2M server is randomized. That is, following the first state-modifying message (SMM1), the state digest (SD) of the LWM2M client 110 may be generated at each end according to the function:

$$SD = f(SMM1 + nonce) \qquad [3]$$

After a reconnection 606, the LWM2M client 110 may send a request 608 to the LWM2M server 200 for the current state stored by the LWM2M server 200. The LWM2M server generates the state digest using the nonce value according to Equation [3] and transmits the state digest to the LWM2M client 110 in a message 612. The LWM2M client 110 generates its understanding of the state digest using Equation [3] (block 616) and compares the two values at block 618. If the values match, the LWM2M client 110 sends a message 620 indicating that to the LWM2M server 200. Because LWM2M clients 110 may transmit some similar messages, such as registration messages, it is possible that they would produce similar state digests. Thus, an attacker could potentially guess the state of a device by examining the state digests exchanged between the LWM2M client 110 and the LWM2M server. By including a nonce value in the calculation, the state digests may be randomized so that an attacker would be impeded from guessing the state of a client from the state digest.

Figure 7:
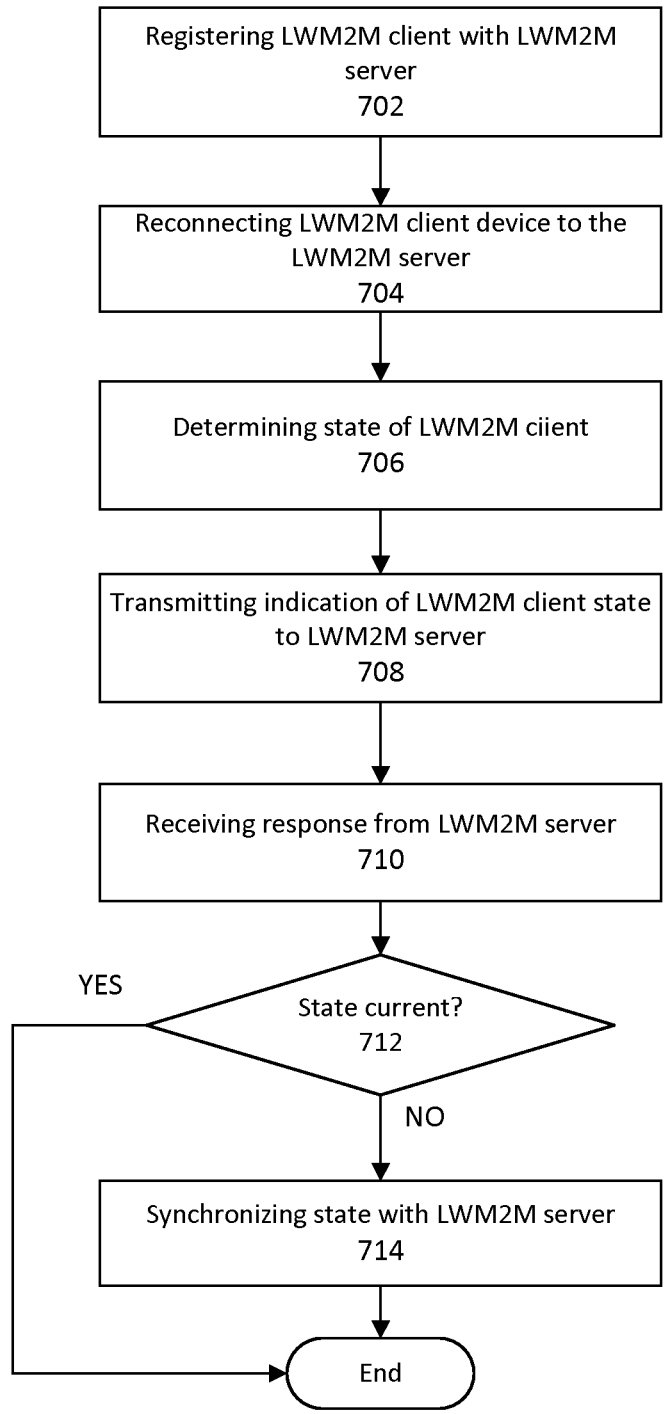
FIGS. 7, 8, and 9, are flowcharts illustrating operations of an LWM2M server according to some embodiments of the inventive concepts.
Figure 8:
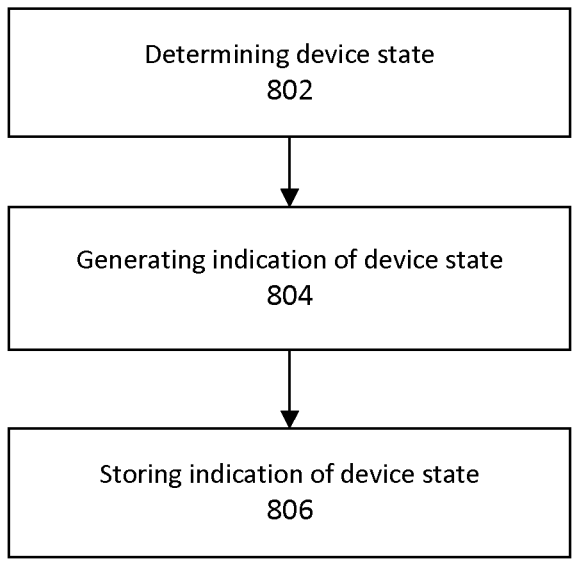

FIGS. 7 and 8 are flowcharts illustrating methods of operating a LWM2M client 110 according to some embodiments. Referring to FIG. 7, a method of re-establishing a connection between a LWM2M client 110 and an LWM2M server 200 following a reconnection of the LWM2M client 110 includes determining 706, at the LWM2M client 110, a state of the LWM2M client 110 device prior to reconnection of the LWM2M client, transmitting 708, to the LWM2M server 200, an indication of the state of the LWM2M client 110 prior to reconnection of the LWM2M client 110, and receiving 710 a response from the LWM2M indicating whether the indicated state of the LWM2M client 110 is an expected state or an unexpected state.

If the response from the LWM2M server indicates that the indicated state of the LWM2M client is out of date, the method may further include synchronizing 714 the state of the LWM2M client 110 with the LWM2M server.

The state of the LWM2M client 110 prior to reconnection of the LWM2M client 110 may be determined by obtaining the indication of the state of the LWM2M client 110 prior to reconnection of the LWM2M client 110.

Referring to FIG. 8, in some embodiments, the method may further include, prior to the reconnection of the LWM2M client 110, determining 802 a state of the LWM2M client 110, generating 804 the indication of the state of the LWM2M client 110 based on the determined state of the LWM2M client 110, and storing 806 the indication of the state of the LWM2M client 110.

In some embodiments, the indication of the state of the LWM2M client 110 may include a state counter or generation counter.

In some embodiments, the indication of the state of the LWM2M client 110 may include a digest value that is generated as a function of a state modifying message that was transmitted or received by the LWM2M client 110. The state modifying message may include, for example, a registration message, an observe subscription message and/or an observe data transmission.

The digest value may include a hash value generated using a hashing function that is applied to the state modifying message. In some embodiments, the digest value may include a checksum value generated using a checksum function that is applied to the state modifying message.

The indication of the state of the LWM2M client 110 may include a digest value that is generated as a function of a state modifying message that was transmitted or received by the LWM2M client 110 and a nonce value that was exchanged between the LWM2M client 110 and the LWM2M server at registration of the LWM2M client 110 to the LWM2M server 200.

The indication of the state of the LWM2M client 110 may include a digest value that is generated as a function of a plurality of state modifying messages that were transmitted or received by the LWM2M client 110.

A reconnection may occur upon a restarting the LWM2M client 110 such as by rebooting the LWM2M client 110 after a shutdown and/or waking the LWM2M client 110 up from a sleep mode.

If the response from the LWM2M server indicates that the indicated state of the LWM2M client 110 is out of date, the LWM2M client 110 may re-register with the LWM2M server 200 and/or update existing observe subscriptions.

In some embodiments, if the response from the LWM2M server indicates that the indicated state of the LWM2M client 110 is unexpected, the method may further include re-registering the LWM2M client 110 to the LWM2M server 200.

Figure 9:
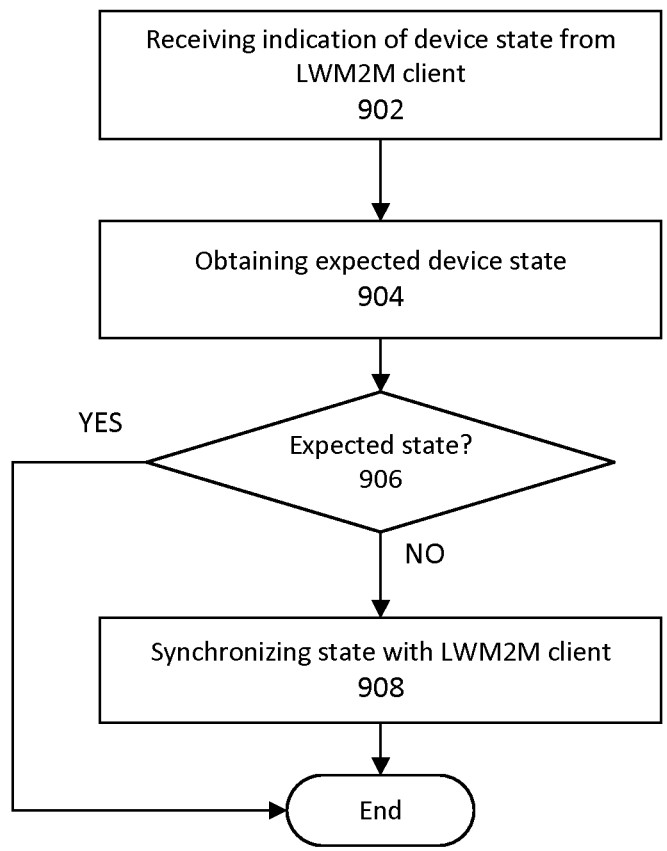

FIG. 9 illustrates a method of re-establishing a connection between a LWM2M client 110, and an LWM2M server 200 following a reconnection of the LWM2M client 110. The method includes receiving 902, from the LWM2M client 110, an indication of a state of the LWM2M client 110, obtaining 904 an expected state of the LWM2M client 110, comparing the indication of the state of the LWM2M client 110 with an expected state of the LWM2M client 110, and in response to the comparison of the indicated state of the LWM2M client 110 with the expected state of the LWM2M client 110, determining 906 that the indicated state of the LWM2M client 110 is an expected or unexpected state, and synchronizing 908 the state of the LWM2M client 110 with the LWM2M server 200 if the state is an unexpected state.

Figure 10:
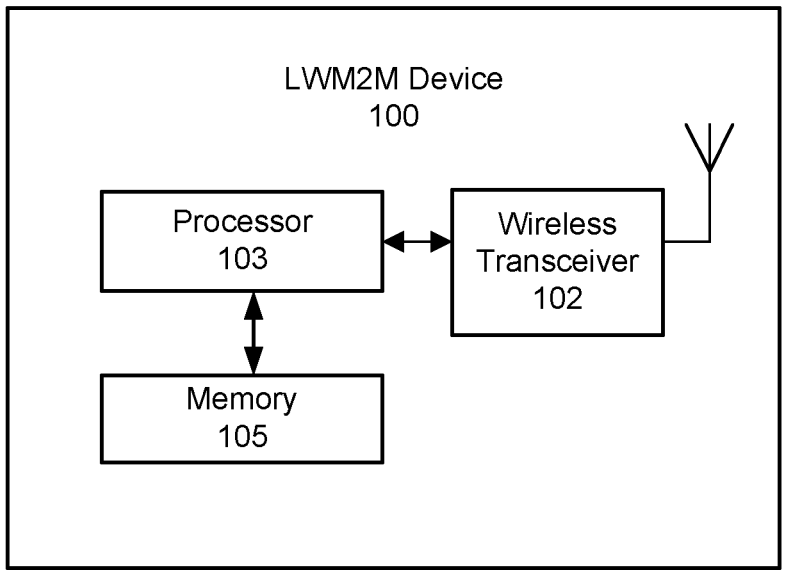
FIG. 10 is a block diagram of an LWM2M client device according to some embodiments of the inventive concepts.

FIG. 10 is a block diagram illustrating elements of a LWM2M client device 100 according to some embodiments. As shown, the LWM2M client device 100 may include a wireless transceiver circuit 102 for providing a wireless communication interface with network nodes, such as base stations, access points, etc. The LWM2M client device 100 may also include a processor circuit 103 (also referred to as a processor) coupled to the transceiver circuit 102 and a memory circuit 105 (also referred to as memory) coupled to the processor circuit. The memory circuit 105 may include computer readable program code that when executed by the processor circuit 103 causes the processor circuit to perform operations according to embodiments disclosed herein. According to other embodiments, the processor circuit 103 may include a memory so that a separate memory circuit is not required.

As discussed herein, operations of the LWM2M client device 100 may be performed by processor 103 and the wireless transceiver circuit 102. For example, the processor 103 may control the wireless transceiver circuit 102 to transmit communications to one or more other network nodes and/or to receive communications from one or more other network nodes. Moreover, modules may be stored in memory 105, and these modules may provide instructions so that when instructions of a module are executed by processor 103, processor 103 performs respective operations (e.g., operations discussed herein with respect to an LWM2M client device 100).

In particular, the memory 105 may include machine readable program instructions that, when executed by the processor circuit, cause the LWM2M client device 100 to perform the operations comprising reconnecting 704 an LWM2M client 110 hosted by the LWM2M client device 100 to an LWM2M server 200, determining 706, at the LWM2M client 110, a state of the LWM2M client 110 device prior to reconnection of the LWM2M client, transmitting 708, to the LWM2M server 200, an indication of the state of the LWM2M client 110 prior to reconnection of the LWM2M client 110, and receiving 710 a response from the LWM2M indicating whether the indicated state of the LWM2M client 110 is an expected state or an unexpected state.

Figure 11:
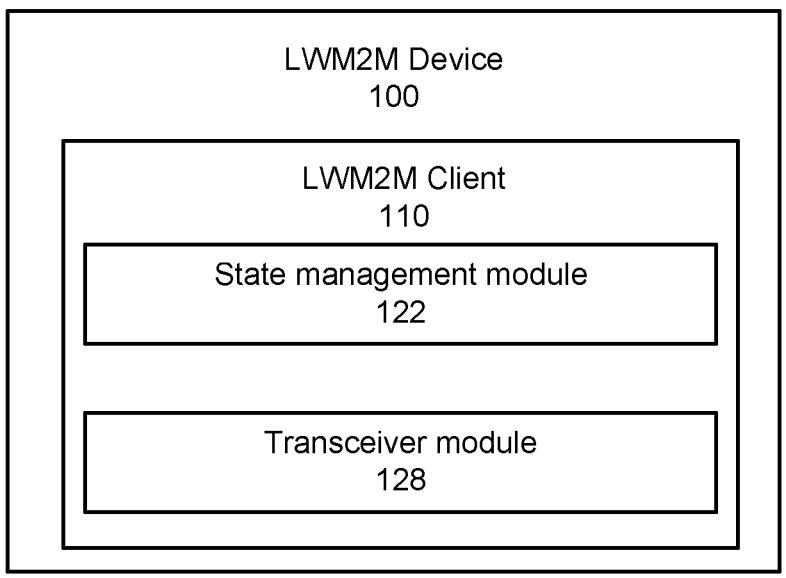
FIG. 11 is a block diagram illustrating functional modules of an LWM2M client device according to some embodiments of the inventive concepts.

FIG. 11 illustrates various functional modules of an LWM2M client device 100 according to some embodiments. The functional modules may be stored, for example, in the memory 105 of the LWM2M client device 100. The functional modules may include a state management module 122 that manages the state of the LWM2M client 110, and generates indications of the state of the LWM2M client 110, such as digest value or counter values, and a transceiver module 128 that performs operations of transmitting and receiving messages to/from the LWM2M server.

Figure 12:
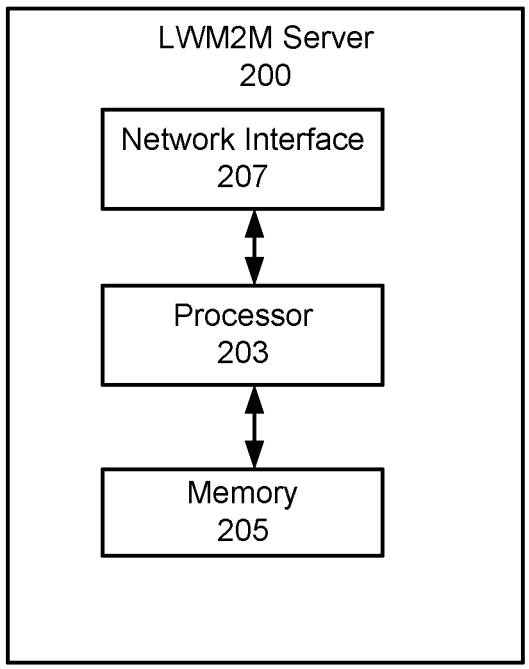
FIG. 12 is a block diagram of an LWM2M server according to some embodiments of the inventive concepts.

FIG. 12 is a block diagram illustrating elements of an LWM2M server 200 of a communication system according to some embodiments. As shown, the LWM2M server 200 may include a network interface circuit 207 (also referred to as a network interface) configured to provide communications with other nodes (e.g., with base stations, RAN nodes and/or core network nodes) of the communication network. The LWM2M server 200 may also include a processor circuit 203 (also referred to as a processor) coupled to the network interface 207, and a memory circuit 205 (also referred to as memory) coupled to the processor circuit. The memory circuit 205 may include computer readable program code that when executed by the processor circuit 203 causes the processor circuit to perform operations according to embodiments disclosed herein. According to other embodiments, processor circuit 203 may include a memory so that a separate memory circuit is not required.

As discussed herein, operations of the LWM2M server 200 may be performed by processor 203, the wireless transceiver circuit 202 and/or the network interface 207. For example, the processor 203 may control the network interface 207 to transmit communications through network interface 207 to one or more other network nodes and/or LWM2M client devices and/or to receive communications through network interface from one or more other network nodes and/or LWM2M client devices. Moreover, modules may be stored in memory 205, and these modules may provide instructions so that when instructions of a module are executed by processor 203, processor 203 performs respective operations (e.g., operations discussed herein).

In particular, the memory 205 includes machine readable program instructions that, when executed by the processor circuit, cause the LWM2M server to perform the operations comprising receiving 902, from the LWM2M client 110, an indication of a state of the LWM2M client 110, obtaining 904 an expected state of the LWM2M client 110, comparing the indication of the state of the LWM2M client 110 with an expected state of the LWM2M client 110, and in response to the comparison of the indicated state of the LWM2M client 110 with the expected state of the LWM2M client 110, determining 906 that the indicated state of the LWM2M client 110 is expected or unexpected, and synchronizing 908 the state of the LWM2M client 110 with the LWM2M server 200 if the state is an unexpected state.

Figure 13:
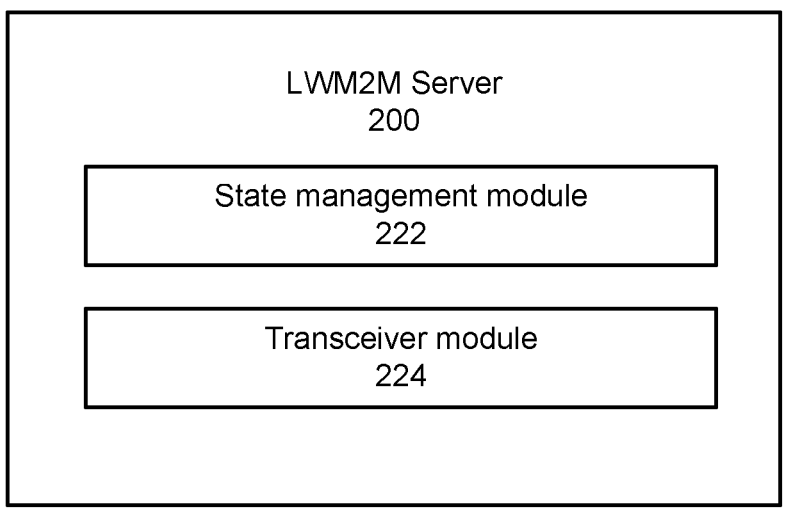
FIG. 13 is a block diagram illustrating functional modules of an LWM2M server according to some embodiments of the inventive concepts.

FIG. 13 illustrates various functional modules of an LWM2M server 200 according to some embodiments. The functional modules may be stored, for example, in the memory 205 of the LWM2M server 200. The functional modules may include a state management module 222 and a transceiver module 224. The transceiver module 224 may perform operations of transmitting and receiving messages to/from the LWM2M client as described herein. The state management module 222 may keep track of the states of one or more LWM2M clients as described herein.

Explanations are provided below for abbreviations that are mentioned in the present disclosure.

| Abbreviation | Explanation |
| --- | --- |
| CoAP | Constrained Application Protocol |
| M2M | Machine-to-Machine |
| LWM2M | Lightweight Machine-to-Machine |
| RAN | Radio Access Network |
| IoT | Internet of Things |
| WWW | World Wide Web |
| DTLS | Datagram Transport Layer Security |
| IETF | Internet Engineering Task Force |
| HTTP | Hypertext Transport Protocol |
| OMA DM | OMA SpecWorks Device Management |
| UDP | User Datagram Protocol |
| TCP | Transmission Control Protocol |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A lightweight machine-to-machine, LWM2M, client device, comprising:
   a processor circuit;
   a transceiver coupled to the processor circuit; and
   a memory coupled to the processor circuit, wherein the memory comprises machine readable program instructions that, when executed by the processor circuit, cause the LWM2M client device to perform operations comprising:
      reconnecting an LWM2M client operating in the LWM2M client device with an LWM2M server;
      determining a state of the LWM2M client;
      transmitting, to the LWM2M server, an indication of the state of the LWM2M client, wherein the indication of the state comprises a state digest that is generated by the LWM2M client;
      receiving a response from the LWM2M server indicating whether the indicated state of the LWM2M client is an expected state of the LWM2M client or an unexpected state of the LWM2M client; and
      synchronizing the state of the LWM2M client with the LWM2M server in response to the response from the LWM2M server indicating that the indicated state of the LWM2M client is the unexpected state,
      wherein the indication of the state of the LWM2M client is generated based on the determined state of the LWM2M client, and
      wherein the generated indication of the state of the LWM2M client is stored prior to the reconnection of the LWM2M client.

2. The LWM2M client device of claim 1, wherein the LWM2M client device determines the state of the LWM2M client prior to reconnection of the LWM2M client by obtaining the indication of the state of the LWM2M client prior to reconnection of the LWM2M client.

3. The LWM2M client device of claim 1, wherein the indication of the state of the LWM2M client comprises a state counter that is updated each time the LWM2M client sends or receives a state-modifying message.

4. The LWM2M client device of claim 1, wherein the indication of the state of the LWM2M client comprises a digest value that is generated as a function of a client state resulting from a state modifying message that was transmitted or received by the LWM2M client.

5. The LWM2M client device of claim 4, wherein the indication of the state of the LWM2M client comprises a digest value that is generated as a function of a client state resulting from a state modifying message that was transmitted or received by the LWM2M client and a nonce value that was exchanged between the LWM2M client and the LWM2M server at registration of the LWM2M client to the LWM2M server.

6. The LWM2M client device of claim 1, wherein the indication of the state of the LWM2M client comprises a digest value that is generated as a function of at least one state modifying message that was transmitted or received by the LWM2M client.

7. The LWM2M client device of claim 1, further comprising:
   re-registering the LWM2M client with the LWM2M server in response to the response from the LWM2M server indicating that the indicated state of the LWM2M client is the unexpected state of the LWM2M client.

8. The LWM2M client device of claim 1, wherein the LWM2M client device is further configured to update existing observe subscriptions in response to the response from the LWM2M server indicating that the indicated state of the LWM2M client is the unexpected state of the LWM2M client.

9. The LWM2M client device of claim 1, wherein the indication of the state of the LWM2M client comprises a digest value that is generated as a function of a one or more parameters, settings or values stored at the LWM2M client that characterize a present state of the LWM2M client.

10. The LWM2M client device of claim 1, wherein the indication of the state of the LWM2M client comprises a generation counter, wherein the generation counter begins at a random value when the generation counter is reset.

11. A method of re-establishing a connection between a lightweight machine-to-machine, LWM2M, client, and an LWM2M server, the method being performed by the LWM2M client device, and comprising:

reconnecting the LWM2M client to the LWM2M server;
determining, at the LWM2M client, a state of the LWM2M client prior to reconnection of the LWM2M client;
transmitting, to the LWM2M server, an indication of the state of the LWM2M client prior to reconnection of the LWM2M client, wherein the indication of the state comprises a state digest that is generated by the LWM2M client;
receiving a response from the LWM2M server indicating whether the indicated state of the LWM2M client is an expected state of the LWM2M client or an unexpected state of the LWM2M client; and
synchronizing the state of the LWM2M client with the LWM2M server in response to the response from the LWM2M server indicating that the indicated state of the LWM2M client is the unexpected state,
wherein the indication of the state of the LWM2M client is generated based on the determined state of the LWM2M client, and
wherein the generated indication of the state of the LWM2M client is stored prior to the reconnection of the LWM2M client.

12. The method of claim 11, wherein the indication of the state of the LWM2M client comprises a generation counter, wherein the generation counter begins at a random value when the generation counter is reset.

13. A lightweight machine-to-machine, LWM2M, server, comprising:
a processor circuit;
a network interface coupled to the processor circuit; and
a memory coupled to the processor circuit, wherein the memory comprises machine readable program instructions that, when executed by the processor circuit, cause the LWM2M server to perform the operations comprising:
receiving, from the LWM2M client, an indication of a state of the LWM2M client, wherein the indication of the state comprises a state digest that is generated by the LWM2M client;
obtaining an expected state of the LWM2M client;
comparing the indication of the state of the LWM2M client with the expected state of the LWM2M client, and in response to the comparison of the indicated state of the LWM2M client with the expected state of the LWM2M client, determining whether the indicated state of the LWM2M client is the expected state or an unexpected state of the LWM2M client; and
synchronizing the state of the LWM2M client with the LWM2M server in response to determining that the indicated state of the LWM2M client is the unexpected state;
wherein the indication of the state of the LWM2M client is generated based on a determined state of the LWM2M client, and
wherein the generated indication of the state of the LWM2M client is stored prior to a reconnection of the LWM2M client.

14. The LWM2M server of claim 13, wherein the LWM2M server synchronizes the state of the LWM2M client with the LWM2M server by resetting the expected state of the LWM2M client to match the indicated state of the LWM2M client.

15. The LWM2M server of claim 13, wherein the indication of the state of the LWM2M client comprises a state counter that is updated each time the LWM2M client sends or receives a state-modifying message.

16. The LWM2M server of claim 13, wherein the LWM2M server synchronizes the state of the LWM2M client with the LWM2M server by re-sending a state modifying message to the LWM2M client.

17. The LWM2M server of claim 13, wherein the LWM2M server synchronizes the state of the LWM2M client with the LWM2M server by transmitting a command to the LWM2M device to re-register with the LWM2M server.

18. The LWM2M server of claim 13, wherein the indication of the state of the LWM2M client comprises a generation counter, wherein the generation counter begins at a random value when the generation counter is reset.

19. A method of re-establishing a connection between a lightweight machine-to-machine, LWM2M, client, and a LWM2M server following reconnection with the LWM2M client, the method being performed by the LWM2M server, and comprising:
receiving, from the LWM2M client, an indication of a state of the LWM2M client, wherein the indication of the state comprises a state digest that is generated by the LWM2M client;
obtaining an expected state of the LWM2M client;
comparing the indication of the state of the LWM2M client with the expected state of the LWM2M client, and in response to the comparison of the indicated state of the LWM2M client with the expected state of the LWM2M client, determining that the indicated state of the LWM2M client is the expected state or an unexpected state of the LWM2M client; and
synchronizing the state of the LWM2M client with the LWM2M server in response to determining that the indicated state of the LWM2M client is the unexpected state,
wherein the indication of the state of the LWM2M client is generated based on a determined state of the LWM2M client, and
wherein the generated indication of the state of the LWM2M client is stored prior to a reconnection of the LWM2M client.

20. The method of claim 19, wherein determining the state of the LWM2M client comprises determining the state of the LWM2M client following reconnection of the LWM2M client with the LWM2M server.

21. The method of claim 19, wherein the indication of the state of the LWM2M client comprises a generation counter, wherein the generation counter begins at a random value when the generation counter is reset.

* * * * *